(12) United States Patent
Warrick et al.

(10) Patent No.: US 10,248,111 B2
(45) Date of Patent: *Apr. 2, 2019

(54) OPERATIONAL PROGRAMMING OF A FACILITY

(71) Applicant: ExxonMobil Research and Engineering Company, Annandale, NJ (US)

(72) Inventors: Philip H. Warrick, Oakton, VA (US); Anantha Sundaram, Annandale, NJ (US); Victor P. DePaola, Vienna, VA (US); Jayanth Balasubramanian, Fairfax, VA (US); Stephen R. Bradshaw, Southampton (GB); Gary Robert Kocis, Vienna, VA (US); Joseph W. Evans, McLean, VA (US); Nicholas J. Booker, Falls Church, VA (US); George E. Friedrich, Kingwood, TX (US); Eric A. Winkler, Oakton, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/953,841

(22) Filed: Apr. 16, 2018

(65) Prior Publication Data

US 2018/0231964 A1    Aug. 16, 2018

Related U.S. Application Data

(63) Continuation of application No. 14/589,389, filed on Jan. 5, 2015, now Pat. No. 9,946,252.

(Continued)

(51) Int. Cl.
*H04L 29/08* (2006.01)
*G05B 19/418* (2006.01)
(Continued)

(52) U.S. Cl.
CPC ....... *G05B 19/41885* (2013.01); *G06N 5/045* (2013.01); *G06Q 10/0637* (2013.01); *G05B 2219/32343* (2013.01); *Y04S 10/54* (2013.01)

(58) Field of Classification Search
CPC .................. G05B 15/02; G05B 19/042; G05B 19/41885; G05B 19/056; G05B 19/0426;
(Continued)

(56) References Cited

U.S. PATENT DOCUMENTS

| 6,405,157 B1 | 6/2002 | Fujii |
| 7,032,816 B2 | 4/2006 | Markham et al. |

(Continued)

FOREIGN PATENT DOCUMENTS

WO    2013188481 A2    12/2013

OTHER PUBLICATIONS

Cao et al., RFID for air cargo operations: return on investment analysis through process modeling and simulation, 12 pages (Year: 2011).*

(Continued)

*Primary Examiner* — Thuy Dao
(74) *Attorney, Agent, or Firm* — Glenn T. Barrett (57) ABSTRACT

A decision support tool to assist decision-making in the operation of a facility. The decision support tool allows a user to perform operational programming of the facility so that the analysis of specific operational events is flexible and "on-demand." This is achieved by allowing the user to set scope and timeframe of the analysis according to business needs. As a result, the organization can make better-informed judgments whether to add operational activities and (Continued)

how to adjust the ones already formulated in the program. The decision support tool can also allow for the application of strategies to communicate intent behind the programming instructions and to improve the quality of business decisions.

21 Claims, 7 Drawing Sheets

Related U.S. Application Data (60) Provisional application No. 61/935,742, filed on Feb. 4, 2014.

(51) Int. Cl.
*G05B 23/02* (2006.01)
*G06F 15/16* (2006.01)
*G06N 5/04* (2006.01)
*G06Q 10/06* (2012.01)

(58) Field of Classification Search
CPC ........... G05B 17/02; G05B 19/4185; G05B 19/4183; G06Q 10/06; G06Q 10/08; G06Q 10/0637; G06Q 10/04; G06Q 10/02; G06Q 10/06311; G06F 15/18; H04L 67/12
See application file for complete search history.

(56) References Cited

U.S. PATENT DOCUMENTS

| | | | |
|---|---|---|---|
| 7,357,298 B2 | 4/2008 | Pokorny et al. | |
| 8,214,238 B1 | 7/2012 | Fairfield et al. | |
| 8,386,303 B2 | 2/2013 | McKinney | |
| 8,479,258 B2 | 7/2013 | Weik, III et al. | |
| 8,645,495 B2* | 2/2014 | Johnson | G05B 15/02 700/276 |
| 8,732,106 B1* | 5/2014 | Presgraves | G05B 17/02 706/46 |
| 8,788,230 B2* | 7/2014 | Dobbins | G06Q 10/02 370/216 |
| 8,819,207 B2* | 8/2014 | Ravichandran | G06Q 10/06 705/2 |
| 8,831,970 B2 | 9/2014 | Weik, III et al. | |
| 8,843,571 B2* | 9/2014 | Ravichandran | G06Q 10/06 705/14.25 |
| 8,898,619 B2 | 11/2014 | Chaar et al. | |
| 9,031,681 B2* | 5/2015 | Gentile | G06Q 10/06 700/100 |
| 9,046,621 B2 | 6/2015 | Nielsen et al. | |
| 9,269,251 B2* | 2/2016 | LaLonde | A61N 1/37282 |
| 9,349,107 B2 | 5/2016 | Wewalaarachchi et al. | |
| 9,420,042 B2* | 8/2016 | Raymond | H04L 67/12 |
| 9,542,863 B2* | 1/2017 | Nielsen | G06Q 10/06 |
| 9,946,252 B2 | 4/2018 | Warrick et al. | |
| 10,042,355 B2 | 8/2018 | Sundaram et al. | |
| 2007/0250292 A1 | 10/2007 | Alagappan et al. | |
| 2007/0255441 A1 | 11/2007 | Antanies | |
| 2009/0228330 A1 | 9/2009 | Karras et al. | |
| 2011/0083927 A1 | 4/2011 | Herges et al. | |
| 2011/0087381 A1 | 4/2011 | Hirato et al. | |
| 2011/0113120 A1 | 5/2011 | Johnson et al. | |
| 2011/0276165 A1 | 11/2011 | Ko et al. | |
| 2012/0083927 A1 | 4/2012 | Nakamura et al. | |
| 2012/0191439 A1 | 7/2012 | Meagher et al. | |
| 2013/0339100 A1* | 12/2013 | Warrick | G06Q 10/0637 705/7.36 |
| 2014/0039648 A1* | 2/2014 | Boult | G05B 15/02 700/79 |
| 2014/0058534 A1 | 2/2014 | Tiwari et al. | |
| 2014/0278692 A1 | 9/2014 | Marwah et al. | |
| 2014/0303798 A1 | 10/2014 | Saliba et al. | |
| 2015/0279176 A1 | 10/2015 | Hyde et al. | |

OTHER PUBLICATIONS

Mampilly et al., PFAST: an eclipse-based integrated tool workbench for facilities design, 5 pages (Year: 2005).*
Saad et al., Distributed simulation in manufacturing: simulation of distributed manufacturing enterprises: a new approach, 7 pages (Year: 2003).*
Gayer et al., CFD modelling as an integrated part of multi-level simulation of process plants: semantic modelling approach, 9 pages (Year: 2010).*
International Search Report and Written Opinion PCT/US2015/010134 dated Mar. 12, 2015.
International Search Report and Written Opinion PCT/US2015/010130 dated Mar. 17, 2015.
Garcia-Sabater, et al., "A Decision Support System for Aggregate Production Planning Based on MILP: A Case Study from the Automotive Industry", Computers & Industrial Engineering, 2009, International Conference, Piscataway, NJ, Jul. 6, 2009, pp. 366-371.
Smith, Knowledge-Based Production Management: Approaches, Results and Prospects, Carnegie Mellon University, 1992, 43 pages.
Wynn et al., "A Framework for cost-aware process management: generation of accurate and timely management accounting cost reports", Feb. 2013, 10 pages.
Nakamura et al., "Multi-agent simulation of ground aircraft operations at a large airport", Mar. 2010, 6 pages.
Heilala et al., "Developing simulation-based decision support systems for customer-driven manufacturing operation planning", Dec. 2010, 13 pages.

* cited by examiner

OPERATIONAL PROGRAMMING OF A FACILITY

CROSS-REFERENCE TO RELATED APPLICATIONS

This application is a continuation of U.S. patent application Ser. No. 14/589,389 filed on Jan. 5, 2015, now U.S. Pat. No. 9,946,252, issued on Apr. 17, 2018, which claims priority to U.S. Provisional Application Ser. No. 61/935,742 filed Feb. 4, 2014, which are both herein incorporated by reference in its entirety.

TECHNICAL FIELD

The presently disclosed subject matter relates to decision support tools for the operation of a facility, such as operational programming of the facility. In particular, the presently disclosed subject matter relates to integration of planning and scheduling operations in and around a facility or multiple facilities into a single programming environment or operational program containing both traditional planning and scheduling functionality, which can be structured and updated to perform both tasks seamlessly and simultaneously.

BACKGROUND

Conventional decision support tools for operational problems in the oil and gas industry separate planning and scheduling of activities within a facility into two distinct processes that may be related to each other through one or more databases that share common information or related by shared common information. Namely, a traditional way to interface planning with scheduling is by updating a scheduling database with planning results. The schedule is created based upon planning results. There is little capability to easily identify opportunities associated with changes in the plan or the schedule when changes are made to one of the plan or the schedule. In instances where scheduling difficulties arise either from inadequate planning, or from unforeseeable circumstances, the shared database is updated with scheduling conflicts and planning adjustments are made. However, due to the fact that conventional data aggregation is manual and unstructured, data disaggregation presents a challenge. Therefore, the lack of transparency, which accompanies entering and processing of the data, results in a virtual trial-and-error environment for decision making.

Moreover, when planning and scheduling processes are conducted separately, there is typically a moment in time when one of them is completed for its results and effects to be communicated to the other one. In the conventional art, such temporal delineation is established, for example, by setting a cyclical time period, e.g., one month, when planning is performed and the schedule is updated. However, considering that the operational activities that concern a particular site or a group of sites are ongoing, dividing the planning and scheduling tasks into arbitrary and rigid segments of time causes numerous downsides related to translating the fragmented decision making process into a continuous real-world environment. It is also possible that the planning and scheduling periods may not be aligned.

For instance, when currently available planning tools assemble data from numerous sources (e.g., prices, constraints, unit operating modes), such data is time dependent, because it needs to correspond to the duration of the time period allocated for planning. In case that a duration of an external event or an internal operational event that affects the schedule exceeds the moment designated for planning decisions, such event is intercepted by the arbitrarily set planning layout, and therefore needs to be represented discretely in the scheduling tools. Accordingly, the resulting data must be averaged to represent the time period covered by the planning tools. The above described features of the conventional art render the overall planning and scheduling process overly rigid, labor-intensive and less effective than desired.

Furthermore, conventional decision support tools for planning and scheduling problems in the oil and gas industry have ranged from manual techniques to simulation and/or optimization models as the solution technology. The manual approach, for example, is limited by inadequate processing and analytical capabilities, among other deficiencies. On the other hand, the optimization-based models do not identify the strategy that yields the optimal solution. The lack of understanding limits the effective use of these numerically-based planning and scheduling tools. Similarly, the simulation-based approach is also not strategy-based and frequently relies upon trial and error for purposes of identifying suitable planning and scheduling decisions. The decision makers may run hundreds of cases in order to develop a program that in the end may not meet all of the desired business needs. The simulation approach is rule-based and like the optimization approach does not produce results that are intuitively understood.

In light of the discussed inadequacies of the existing technology, there is a need for a tool that is capable of solving problems that arise from the segregation of planning and scheduling within a facility and that better addresses the continuous nature of the operational activities at a single site or at multiple sites. In addition, it is highly desirable for such tool to indicate intent and strategy behind formulation and adjustment of the operational events, thereby rendering the overall process more transparent and easier to manage. There is a need for an operational programming tool that is capable of optimizing both planning and scheduling operations that can be modified and adjusted on a continuous basis to reflect changes in both the planned operations and scheduled operations.

SUMMARY

The presently disclosed subject matter relates to an operational programming tool that provides a user with the ability to perform operational programming of the facility so that the analysis of specific operational events is flexible and "on-demand." This is achieved by allowing the user to set scope and timeframe of the analysis according to business needs. As a result, the organization can make better-informed judgments whether to add operational events and how to adjust the ones already formulated in the program. The decision support tool also allows for the application of strategies to communicate intent behind the programming instructions and to improve the quality of business decisions.

The presently disclosed subject matter provides a method of programming and operating a facility. The method includes using a computer system that stores an operational programming application, wherein the operational programming application comprises an operational program for determining the operation of at least one facility. The method further includes acquiring data from operational events of the at least one facility and entering the data into the operational program, wherein feasibility of the operational program is maintained. The method also includes setting a scope of the data to be analyzed, wherein the scope of the analysis is defined based on at least one operational event of interest and assembling the data within the scope of the analysis in a structured and automated manner. The method still further includes processing the assembled data using at least one of a mathematical model defined from the assembled data and a strategy-based procedure and obtaining results for the defined scope of the analysis and disassembling the obtained results in a structured and automated manner according to the obtained results. The method includes adjusting the operational program by incorporating the obtained result into the program, and programming and operating the at least one facility according to the adjusted operational program.

The scope of the analysis may be based on the at least one operational event that affects at least a portion of a facility, a single facility, multiple facilities or one or more portions of multiple facilities. The scope of the analysis is set according to a duration of the at least one operational event of interest.

The operational events of the at least one facility entered into the operational program are one of two types of events: defined operational events and undefined operational events. The ratio of a number of the defined operational events to a number of the undefined operational events entered into the operational program changes with passage of time.

The presently disclosed subject matter is also directed to a computer system for determining the operation of a facility. The computer system being programmed to perform steps that comprise: (a) storing an operational programming application, wherein the operational programming application comprises an operational program for determining the operation of at least one facility; (b) acquiring data from operational events of the at least one facility and entering the data into the operational program, wherein feasibility of the operational program is maintained; (c) setting a scope of the data to be analyzed, wherein the scope of the analysis is defined based on at least one operational event of interest; (d) assembling the data within the scope of the analysis in a structured and automated manner; (e) processing the assembled data using at least one of a mathematical model defined from the assembled data and a strategy-based procedure and obtaining results for the defined scope of the analysis; (f) disassembling the obtained results in a structured and automated manner according to the obtained results; and (g) adjusting the operational program by incorporating the obtained result into the program.

The presently disclosed subject matter is also directed to non-transitory machine-readable storage medium comprising instructions which, when executed by a processor, cause the processor to: (a) store an operational programming application, wherein the operational programming application comprises an operational program for determining the operation of at least one facility; (b) acquire data from operational events of the at least one facility and entering the data into the operational program, wherein feasibility of the operational program is maintained; (c) set scope of the data to be analyzed, wherein the scope of the analysis is defined based on at least one operational event of interest; (d) assemble the data within the scope of the analysis in a structured and automated manner; (e) process the assembled data using at least one of a mathematical model defined from the assembled data and a strategy-based procedure and obtain results for the defined scope of the analysis; (f) disassemble the obtained results in a structured and automated manner according to the obtained results; and (g) adjust the operational program by incorporating the obtained result into the program.

DETAILED DESCRIPTION

The presently disclosed subject matter provides a tool to develop the operational program for one or more facility(s). The tool is preferably a decision support tool, but is not intended to be so limited; rather, it is contemplated that other tools or means that enable operational programming are within the scope of the presently disclosed subject matter. The presently disclosed subject matter will be described in connection with one or more petrochemical facilities for purpose of illustration. It is intended that the presently disclosed subject matter may be used at any site where programming of the activities is or is desired to be a normal part of operating the site. The operation of a petrochemical facility may involve various decisions, including the process operations, blending operations, transportation of materials (e.g. feeds, intermediates, or products) to and/or from the facility (e.g. via maritime shipping, rail, truck, pipeline, etc.), cargo assignments, vessel assignments, evaluation and selection of raw or feed materials, and the timing of these activities. Examples of petrochemical facilities include, but are not limited to, refineries, storage tank farms, chemical plants, lube oil blending plants, pipelines, distribution facilities, LNG facilities, basestock production facilities, and crude, feedstock and product blending facilities. The presently disclosed subject matter may also be used in connection with facilities that produce and transport crude oil and/or refined intermediate and/or finished products including but not limited to chemicals, base stocks, and fractions. It is also contemplated that the presently disclosed subject matter may be used in other operations and facilities that are not associated with petroleum and petrochemical processing, but where operational programming issues are present.

Figure 1:
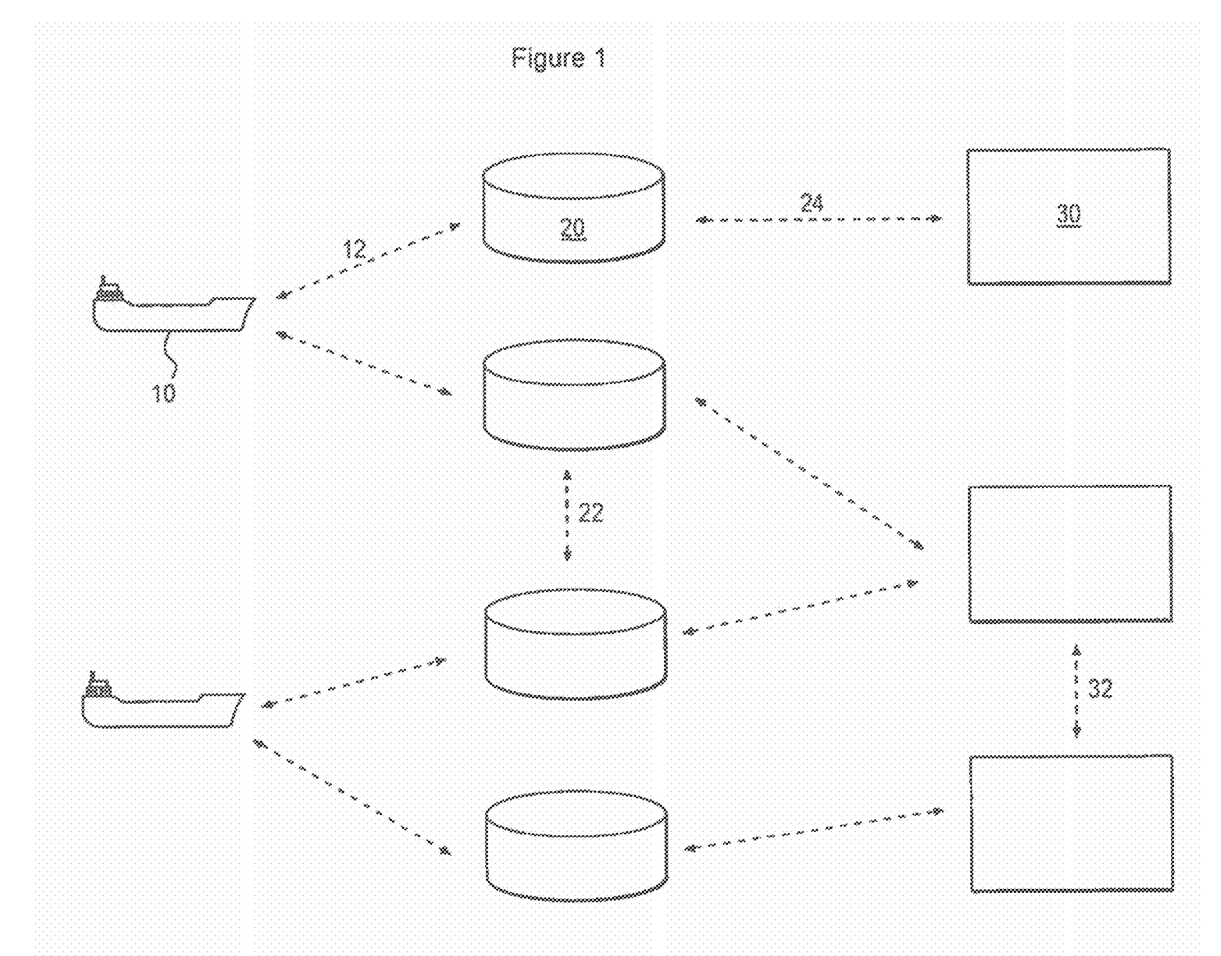
FIG. 1 shows an example of a facility to which the tool of the present invention can be applied.

FIG. 1 shows an example of a refinery or petrochemical facility that can be operated utilizing the presently disclosed subject matter. The refinery includes storage tanks 20 and processing equipment 30 (e.g. crude distillation units, steam and catalytic cracking units, hydroprocessing units, blenders, reactors, separation units, mixers, chemical processing units, utilities (including the supply of hydrogen and other feeds necessary for the production of refined products) etc.). Operations in the refinery include the transfer 12 (discharging and/or loading) of materials between the ships 10 and storage tanks 20. There may also be transfers 22 of material between tanks 20. There may also be transfer 24 of materials between storage tanks 20 and processing equipment 30. There may also be transfer 32 of materials between processing equipment 30. Processing equipment 30 may transform a feed material or raw material into a different material. The operation of the refinery can include numerous other activities, such as selection of raw materials, etc. The tool in accordance with the presently disclosed subject matter may be utilized to program the operation of the facility.

Figure 2:
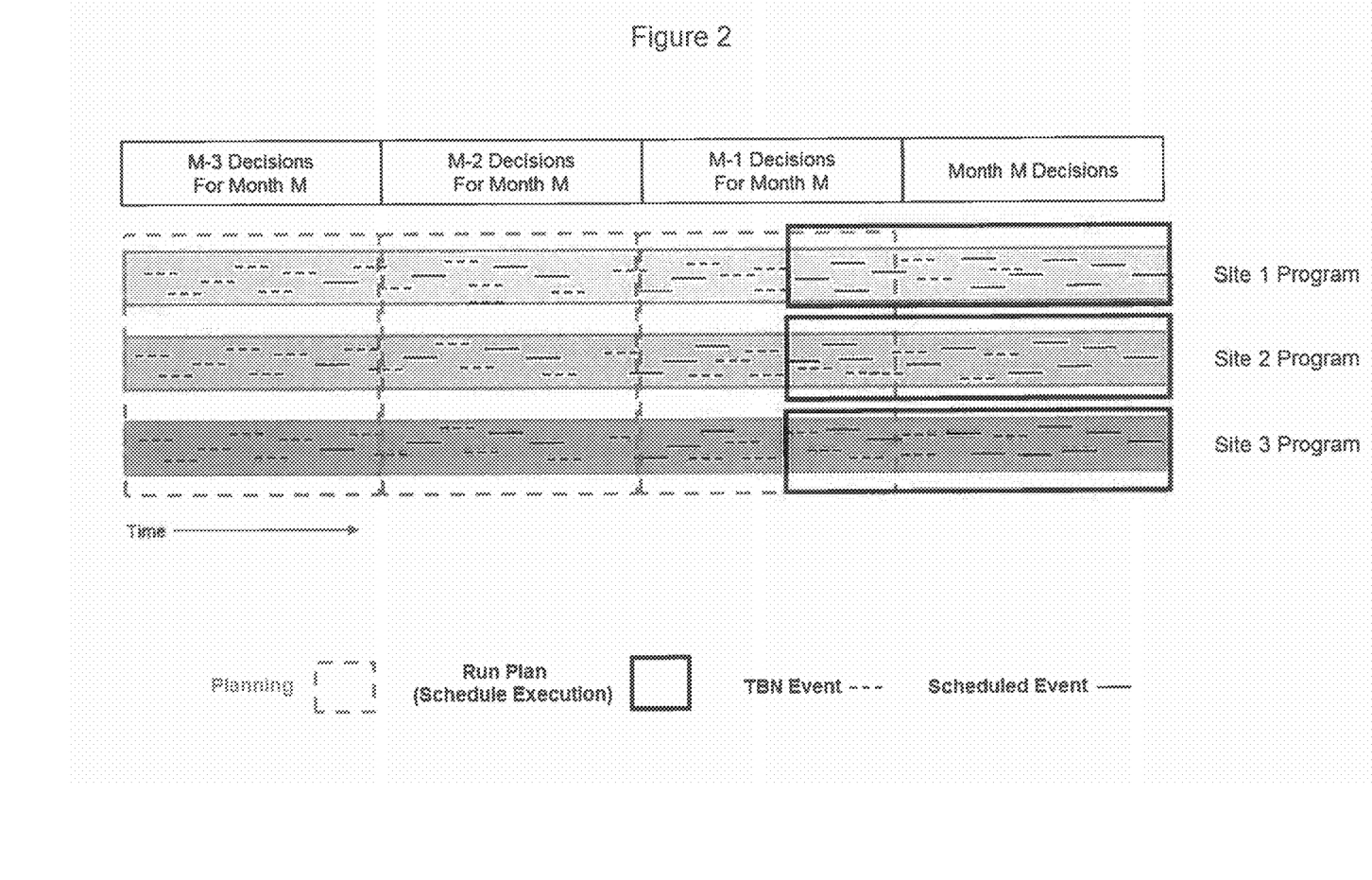
FIG. 2 shows an example of segregated planning and scheduling performed in the conventional technology.

FIG. 2 illustrates a conventional planning and scheduling table or spreadsheet that encompasses activities within a set of operational sites. The conventional table or spreadsheet is formed and updated by using either manual or computer based methodologies. In the example of FIG. 2, the sites are operated simultaneously, and the events within individual sites may or may not affect each other. In accordance with the presently disclosed subject matter, an event is considered to include one or more activities having a start time, duration and/or an end time. Moreover, the final scheduling, referred to in the prior art as a "run plan," is executed predominantly for operational events that take place during month M. The timespan of the planning and scheduling table or spreadsheet within the three sites extends across four consecutive months, denoted as months M−3 (i.e., three months prior to month M), M−2 (i.e., two months prior to month M), M−1 (i.e., one month prior to month M) and M.

In FIG. 2, the operational events (e.g. distillation, mixing, separation, chemical reaction, etc.) are represented by line segments within each site, and are divided into two categories: events yet to be named ("TBN events"), demarked by thin dashed lines, and events that have already been formulated, but are also subject to scheduling adjustment ("scheduled events"), shown by solid thin lines. In accordance with the presently disclosed subject matter, an event can include one or more events that can collectively form a single event. The single event can be broken down into a series of events having discrete durations (e.g., three separate weekly events are aggregated into a single event). The scheduled events originate from a specific business need that defines them, even though their duration and their placement in the schedule may subsequently change. On the other hand, the TBN events are used as "place holders" until more information is available. As shown in FIG. 2, in the earlier stages of the planning process the TBN events are prevalent over the scheduled events. This is because several months before the final scheduling decisions there is a high degree of uncertainty and flexibility regarding various alternative actions and whether and how the external factors would appear. Also, at that time most of the decision variables are not yet narrowed down and converted into actual decisions. In comparison, during month M, most operational events have already been scheduled, because this time period is a part of the "run plan," where the "place holders" have either been removed or fixed into defined operational events.

Traditionally, different approaches are used for planning and scheduling operations. Scheduling is generally performed in response to a particular real time business need or limitation or from anticipated business needs or limitations. Planning, on the other hand, has traditionally been performed separately and periodically involving aggregated events. This lack of integration and coordination between the two interdependent processes is shown in FIG. 2, where scope and frequency of planning related adjustments is preset within the schedule. Dashed rectangles in FIG. 2 indicate planning cycles of a conventional planning and scheduling table or spreadsheet. The scope of the operational events to be analyzed is predetermined, in order for the subsequent decisions to be made.

Typically, one or more complete sites are included in the planning assessment at the same time, with all of the units within each site incorporated in the analysis. One disadvantage of this rigid and cumbersome approach is that not every operational decision or an external factor affects every unit within every individual site. Accordingly, the analysis often includes data that pertains to a portion of the operational activities irrelevant for the required planning decision, thereby rendering event optimization labor-intensive and complex. Furthermore, as shown in FIG. 2, the temporal scope of each analysis is preset to have a constant duration (e.g., one month), in contrast with the duration of the operational events, which are formulated based on the business need and the real-world factors. This discrepancy causes additional drawbacks with the traditional planning and scheduling techniques. Namely, certain operational events are observed as a group just because they fit in an arbitrary time cycle, even when they are otherwise operationally unrelated. On the other hand, related events end up being observed in separate analyses, simply because they belong in two different planning periods.

Moreover, an individual event may be intercepted by an optimizing calculation performed during the course of the event, when the data must be averaged to represent the period covered by the optimization tools. This is yet another limitation of conventional planning and scheduling solutions that causes the mathematical models behind the planning decisions to be unnecessarily cumbersome and counterintuitive, which may result in lost opportunities.

Figure 3:
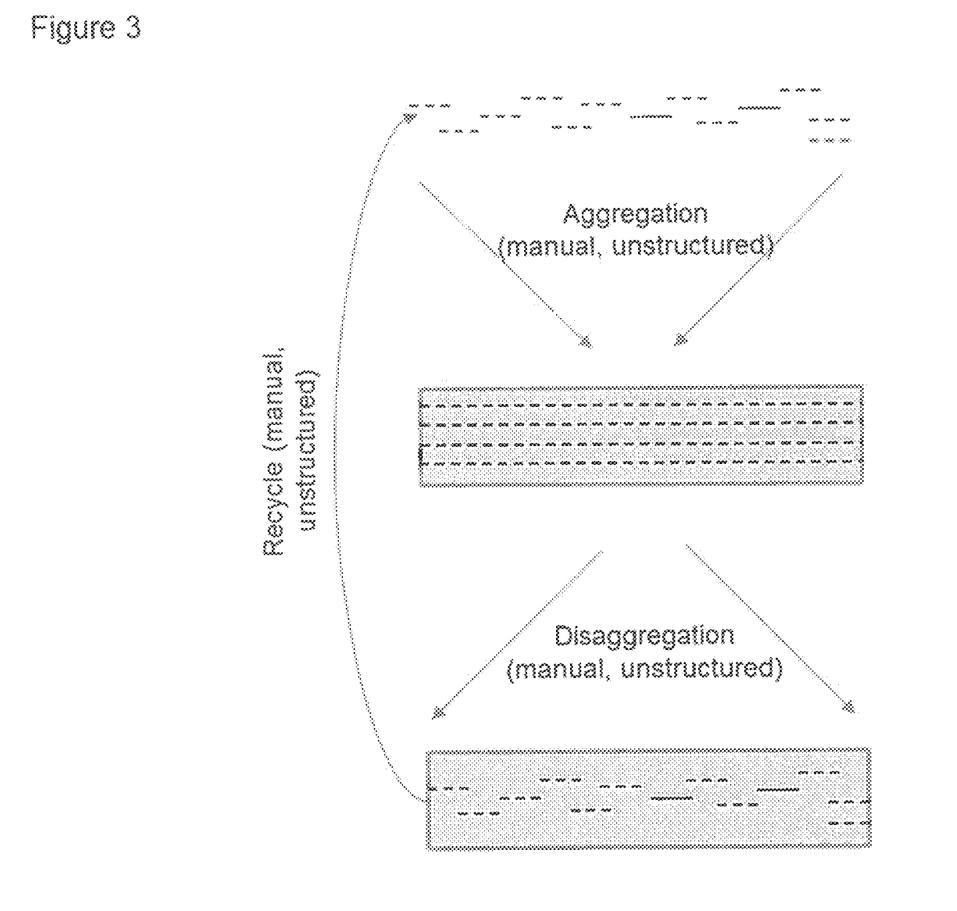
FIG. 3 shows an example of manual and unstructured data aggregation and disaggregation performed in the conventional technology.

In addition, as presented in FIG. 3, the conventional technology acquires data from a number of sources and assembles it accordingly. This aggregation of data is, however, normally done manually and in an unstructured manner. Also, for the planning tools to use the aggregated data to construct a plan of operations, the data needs to be averaged in order to be representative of the time periods preset by the planning tools. Subsequently, at the stage when the scheduling needs to be implemented, the data needs to be represented discretely, in order for it to be arranged among various events and activities within a site. This poses a substantial computational difficulty, because the manual and unstructured aggregation hinders the disaggregation process, which, in turn, becomes manual and unstructured, itself. This causes the overall process of data manipulation and management to become labor intensive and to lack transparency. Consequently, a risk increases that the resulting disaggregated data produced for the scheduling to be executed cannot, in fact, be fit into a feasible schedule. As a result, the data needs to be recycled back into the process for the end result to be adjusted, i.e., for the subsequently corrected data to be schedulable. A further inefficient aspect of the necessary scheduling correction is that the prior unsuccessful scheduling attempt(s) are fairly uninformative for the rescheduling process. Namely, the described opaqueness, present in the conventional process of data aggregation and disaggregation, generally allows the user to merely observe the end result, with no systematic mechanism to indicate why the prior scheduling attempt(s) failed. An example of the current invention, shown in FIG. 4, addresses the explained flaws of the conventional technology by introducing a new approach to developing an operation plan. With the new approach, the user may perform separate planning and scheduling, or combine the two processes into a single mode to develop an operational plan. Thus, the new techniques discussed below are compatible with the traditional planning and scheduling methodologies, and at the same time, they allow for the existing planning and scheduling tasks to be completed more efficiently and effortlessly.

Figure 4:
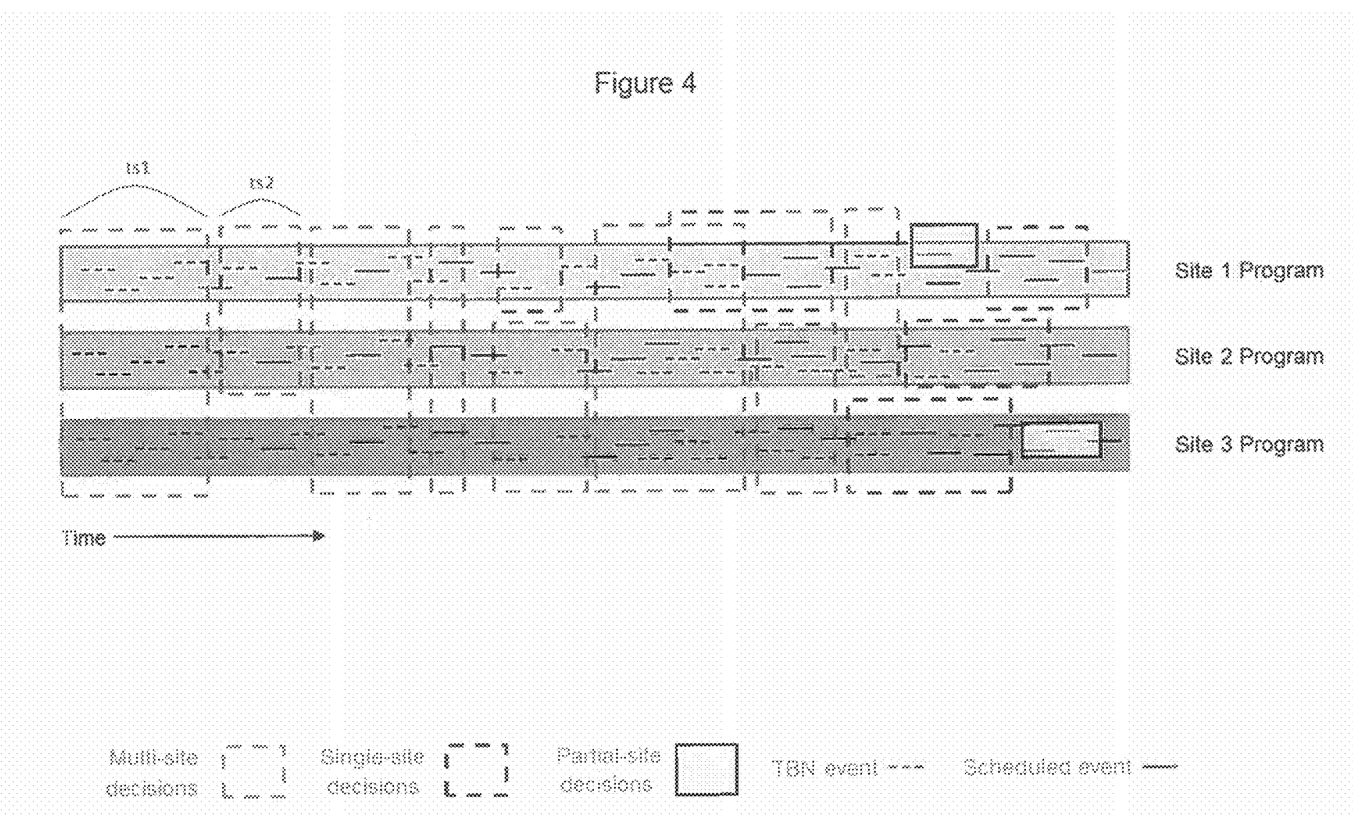
FIG. 4 shows an example of operational programming of the present invention.

FIG. 4 illustrates an example of an operational programming application at an individual site or at multiple sites. This novel approach may eliminate segregation between the planning and scheduling processes, and may combine them in a single, unified operational programming application.

For the purposes of comparison, FIG. 4 presents an example of the operational programming technique in a similar layout to the previously discussed planning and scheduling of the conventional art. In one example, an operational program is presented for three sites, and the activities within the sites may or may not affect each other. The operational events are represented by line segments within each site, and are divided into two categories: the TBN events, demarked by thin dashed lines, and the scheduled events, shown by solid thin lines. The scheduled events originate from a specific business need that defines them, and the TBN events are merely used as "place holders" until more information is available. As shown in FIG. 4, in the earlier stages of the planning process the TBN events may be prevalent over the scheduled events. This is because the uncertainty of whether and how the unknown factors will appear may decrease with the passage of time. Also, with time, an increased number of decision variables may become fixed, thus further adding certainty to the program.

Figure 5:
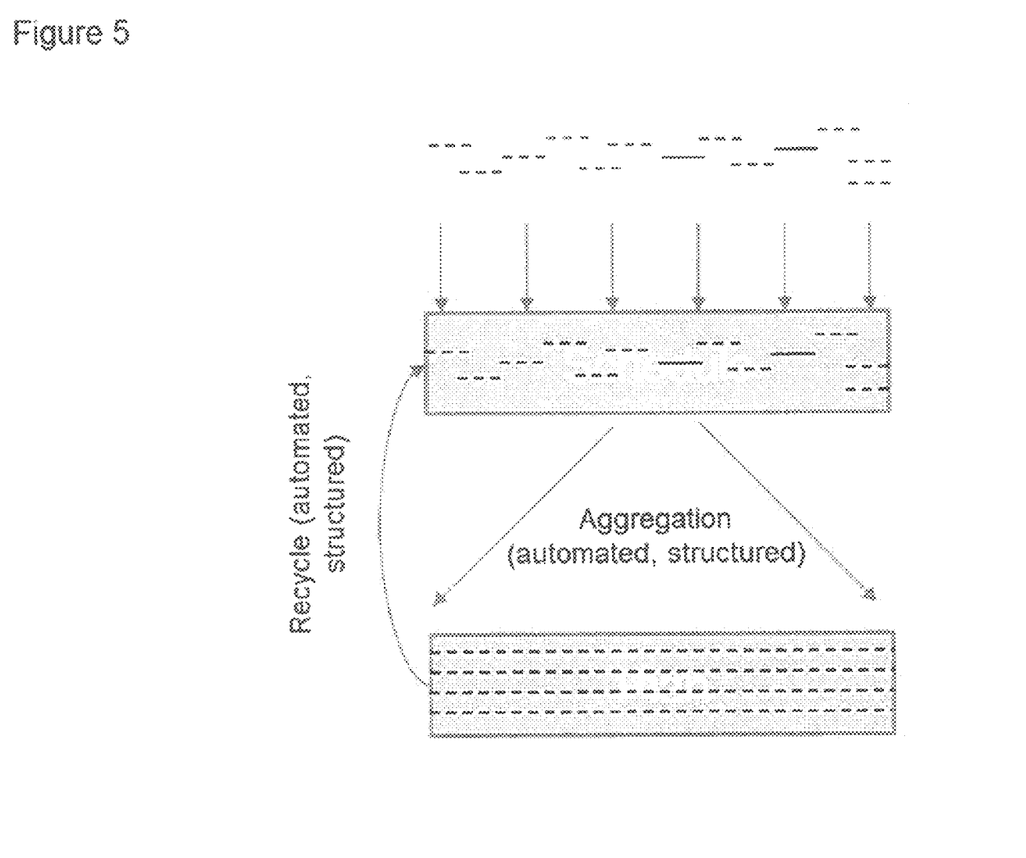
FIG. 5 shows an example of automated and structured data aggregation and recycling of the present invention.

FIG. 5 further illustrates an example of a new approach to data management, developed to facilitate the analysis of the assembled data. Initially, time-dependent data (e.g., prices, constraints, unit operation modes, etc.) may be obtained from a variety of sources and added to the operational program "as-is." Subsequently, the collected data may be divided into discrete elements, which may be organized to develop an achievable schedule of events, in the context of external constraints and the activities within each event. Once the feasibility of the schedule has been established, the planning objectives may be addressed. At that stage, the scheduling data may be aggregated to correspond to time periods covered by the planning tools, by using an automated structured process. This methodology of linking the scheduling with the planning into an integrated operational program is beneficial, because it may enhance the communication between the two sets of tasks. Specifically, the automation and the structuring may obviate the effects that the planning strategies have on the scheduling, as well as the influence that the real-world factors of the scheduling domain have on the planning decisions.

In other words, due to the fact that the data aggregation of the new approach of FIG. 5 may be performed in a structured and automated manner, the disaggregation and the recycling of the data may also be structured and automated, as a consequence. In comparison with the conventional methodology, shown in FIG. 3, these novel techniques may introduce a highly desirable transparency into the traditionally obscure methods. This improved understanding behind the decision making process may cause the necessary scheduling and planning adjustments to be significantly more intelligible than is presently the case.

Turning to the data analysis aspect of the present disclosure, in one example, the operational programming application is created as a flexible, "on-demand" decision assisting tool used to formulate operational events or to adjust or remove the existing ones. That is to say, the operational programming may allow for the analysis of site events to be tailored according to specific questions and concerns that arise in the context of time and that pertain to a particular site or even to a portion or portions of facility (e.g., an individual unit within a facility).

In the program of FIG. 4, the scope and the timeframe of the analysis may be set over a selected operational event or a group of events. Namely, a need for a decision may originate, for example, from an external factor, at which point in time a user may decide to initiate the analysis based on the expected occurrence of the external event. Moreover, the user may set the length of the timeframe of the analysis (ts1, ts2, etc.) by making an operational judgment of how long the events included in the analysis would be affected. This feature is advantageous in comparison with the conventional technology, because the events of interest can be fully but accurately incorporated in the decision making process, with virtually no need for the data to be averaged to represent period covered by the programming tools.

In addition, the operational programming of FIG. 4 may provide additional flexibility with respect to the scope of the analysis. Specifically, the decision making process may further be adjusted to business needs, because the user may either select to observe all of the sites functioning as a group, or only some of them. In other words, if a prior site activity or an external factor affects only two out of three sites, results regarding the third site may be omitted, thus rendering the analysis more focused. As a result, the mathematical modeling may be simplified and the processing is expedited.

Figure 6:
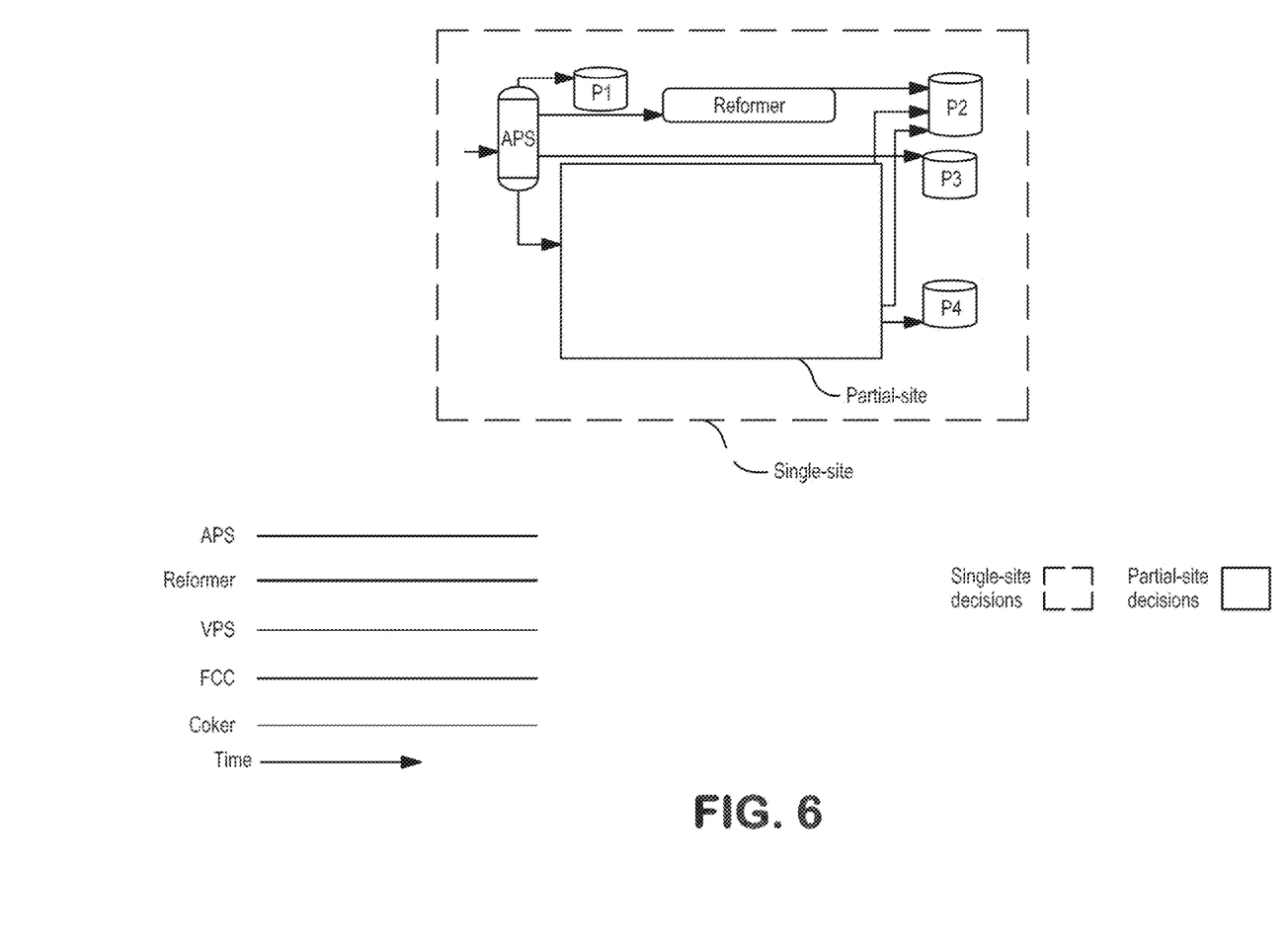
FIG. 6 shows an example of a single site.

Furthermore, as shown in FIG. 6, the event formulation and adjustment may be performed in a partial site or in a shorter time window. This feature may provide more flexible analysis, which can be site or unit specific to suit the desired scope of the analysis. The scope of analysis can be quickly adjusted to fit a desired decision at hand. In particular, if a site contains several units (e.g., coker, reformer, APS unit, etc.) that execute separate processes in time, the analysis may either encompass the entire site or it may cover a unit of interest (e.g., VPS unit) together with other units affected (e.g., coker and FCC unit). Moreover, at the moment of time when an observed operating event within the VPS unit ceases to affect the coker, for example, the coker can be easily excluded from the analysis. The operational programming application may adjust the model to reflect the exclusions.

Figure 7:
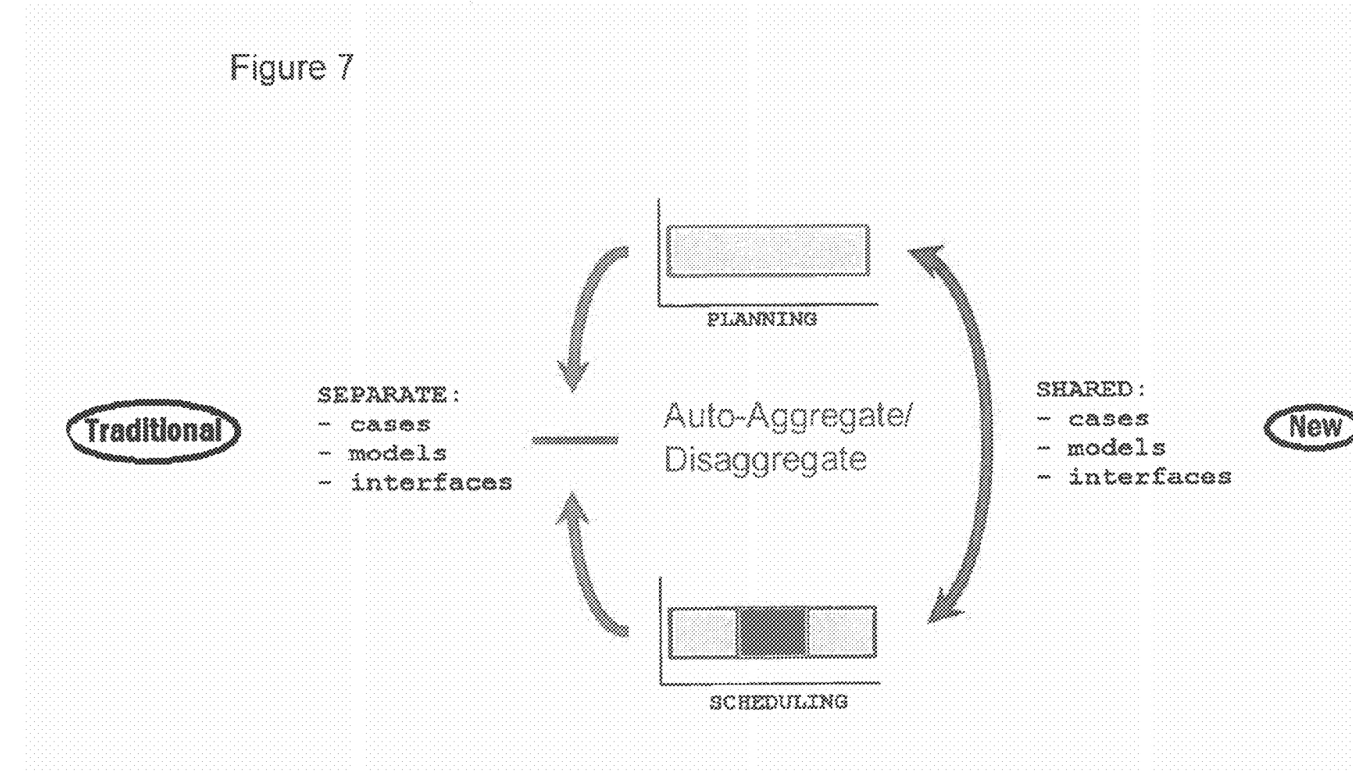
FIG. 7 shows high level distinctions between planning and scheduling tasks of the conventional technology and the present invention.

FIG. 7 presents an example of a high-level comparison between the segregated planning and scheduling of the conventional technology and the presently disclosed integration of the two into an improved operational program. As previously discussed, scheduling and planning are traditionally interfaced with each other through the scheduling database, and as a result the cases and the models used in the decision making process are separate. In contrast, the new operational programming application may remove the interface and seamlessly combine the schedule with the planning process by sharing simulation and optimization engines, process unit models, constraints, topology elements and data interfaces between the two. This integration may substantially facilitate the efficiency of the overall process.

In addition, the smooth transition between planning and scheduling activities may eliminate the presently existing barriers between them, thus allowing the environment of the work processes to become a true continuum. The automated and structured aggregation may enable the disaggregation to be automated and seamless, thereby facilitating quick re-optimization of either planning or scheduling as needed. Such superior effectiveness may be yet another advantage of the operational programming over the traditional lack of transparency.

Regarding the planning tasks, the conventional time-averaged, math optimized analysis, applicable only to the facility as a whole, may be replaced by the novel operational programming technique. Instead, the planning activities of the operational programming application may be constructed out of time-sequenced elements, where the planning is simulated. Furthermore, the planning related tasks conducted within the operational program may encompass a partial site only, or apply to an entire site or multiple sites. Moreover, conventionally, the planning activities have been performed prior to the implementation of the pertinent schedule, whereas the operational programming may establish a feasible schedule first, and then proceed with the analysis and planning decisions. These novel features may expedite the programming of the operations and contribute to the better understanding and awareness behind the decision making.

Furthermore, while the traditional scheduling has typically been time-sequenced and simulated, the new scheduling related tasks executed within the operational program may utilize time-sensitive, math optimized models. As a result, the scheduling activities of the operational programming technique may be conducted faster and more economically.

There may be several techniques of managing the operational program, some of which are manual approach, simulation models and optimization models. In addition to improving application of the programming techniques, for example, by the evaluation of different strategies discussed in detail in International Application PCT/US/2013/045301 (published as WO/2013/188481), the entire contents of which are hereby incorporated by reference, the capability of the operational program to handle analysis modulated to a granular level may allow for the most suitable approach to be applied.

Namely, if a user evaluates that a process within a single unit can be adjusted manually, for example, the corresponding operational event(s) may be modified and the program may be updated accordingly. On the other hand, if the user needs to determine effects of changes to one or more certain parameters on several units within a site, which in turn affect each other, the user may isolate the affected units only. The flexibility to perform the focused analysis may provide the user with an option to, for example, apply a simulation model, grounded in explicit rules, instead of developing a complex optimizing model. Finally, even when the programming decisions are produced by an optimization model, the "on demand" selection of the scope of the parameters and decision variables may simplify the mathematical model and facilitate the computations.

Moreover, the operational programming application may incorporate a strategy-based optimization that provides decision-makers with the ability to compare the performance of different strategies for the operation of the facility, also discussed in International Application PCT/US/2013/045301 (published as WO/2013/188481), the entire contents of which are hereby incorporated by reference. This may enable the organization to make better-informed judgments about which approach to use.

The strategies can be adapted or refined to create new strategies taking into account additional known factors or business drivers. In addition, the strategies may be modified or adapted to minimize the impact of uncertain parameters on the operational programming decisions such that these decisions can be made with greater certainty. The strategies may be modified or adapted to improve performance with respect to a desired performance metric. The strategies may be location specific (e.g., country specific, geographic region specific or facility specific). The strategy is focused to select or accomplish the desired business needs, which may vary from day to day. For example, the desired product slate produced by the facility may vary based upon, inter alia, market conditions, time of year, geopolitical conditions, and other external factors such as weather. The optimal programming for and the operation of the facility may vary based upon each of these factors. The use of the strategy-based module in accordance with the presently disclosed subject matter permits the decision makers to properly and optimally plan for changing conditions such that these conditions are factored into the operational programming process.

The strategy can be developed to address specific conditions, business drivers and other external influences. For example, specific strategies can be developed and utilized within the module that are based upon certain factors such as the supply of raw materials from a specific region of the world, the disruption of such supply, the cost of shipping, etc. Furthermore, specific strategies can be utilized to address certain unexpected conditions (e.g., weather, or the shutdown or failure of a facility unit). The business drivers and goals in advance of, during and after a weather related event (e.g. a hurricane) are very different from normal business drivers. The uncertain parameters associated with these conditions may affect the generated results. The desire to have the facility ready in advance of the weather event will vary the operations previously accounted for. The use of these strategies may facilitate the development of the operational program in accordance with the presently disclosed subject matter.

In response to changes in uncertain or known parameters, the manual approach, the simulation-based approach and the optimization-based approach may create a new solution set that completely revamps a previously developed operational program. The use of the strategy-based approach may be used in conjunction with any of the manual approach, the simulation-based approach and the optimization-based approach to permit the decision maker to more quickly identify what affect the changes in the parameters have on the operational program and what if any revisions are needed. For example, the change may have minimal impact on the results when compared to the performance metric. As such, it may be preferable to continue to use the strategy which had been chosen previously.

The business drivers contained in the strategy can then be used to explain and justify the plan or result obtained based upon the strategy. The use of the strategy-based approach also enables more effective communication of the underlying intent of the operational program (i.e., how to best respond to changes market conditions, weather conditions or other conditions that may affect the operational program). These results may not be the most optimal when compared to the results obtained, for example, from a scheduling optimizer, but the results are likely to be more practical for purposes of implementation to best achieve the desired business objectives of the selected strategy.

Input values in a strategy-based analysis may be received in any suitable manner, including manual entry, loading from a spreadsheet or database, or the input values may be selected or calculated by the tool (e.g. samples selected from a distribution of input values). Because one or more of the parameters are considered uncertain, the decision support tool permits a range of possible input values to be considered in the analysis. Thus, each input case is also associated with the probability of that particular combination of parameter values occurring. The weighting of each case can be calculated in any suitable manner. It is contemplated that the weighting may be based upon a probability or some other factor. For example, each possible input value may be given a weighting factor based on its normalized relative weighting within the sample of input values being used and these weighting factors for different parameters may be multiplied to obtain the weighting of each case.

In order to obtain results of various strategies, a set of input cases is processed using a strategy-based module of the operational programming application to obtain calculations for the performance of each different strategy. The performance is evaluated by measuring the results of the different strategies against a set of one or more common performance metrics. Examples of performance metrics that can be used include: profitability (e.g. total net margin), cost (e.g. overall bunker fuel cost), utilization rate for term vessels, plant equipment utilization, production quantity, production time, etc. Finally, after assessing the performance of a strategy (e.g. against other strategies or against the optimized result), the user can elect to modify a strategy (this action is intended to include the creation of a new strategy) with improved performance. The modification may result in revisions being made to the operational program.

The application of strategies in the operational programming application described above, in combination with the structured automation of the data aggregation and disaggregation, significantly enhances the transparency of the consequent operational program that may incorporate these techniques. Namely, the insight into structured computational models that manipulate and move data between scheduling and planning tasks, combined with the communication of planning intent conveyed by strategies, allows the user to better execute the instructions in the real-world environment. For example, if one scheduling option is unfeasible, the transparent mathematical models of the operational program may indicate the stage of the process, or a specific event, that can be adjusted to arrange the data into a schedulable order. Thus, in addition to the flexibility of validating scheduling adjustments against the transparent operational plan, the strategies may further indicate whether the rescheduling is performed consistently with the planning intent. Such clarity enables the user to respond to unforeseeable influences with far superior operational awareness in comparison with the conventional technologies.

The presently disclosed subject matter may also be embodied as a computer-readable storage medium having executable instructions for performing the various processes as described herein. The storage medium may be any type of computer-readable medium (i.e., one capable of being read by a computer), including non-transitory storage mediums such as magnetic or optical tape or disks (e.g., hard disk or CD-ROM), solid state volatile or non-volatile memory, including random access memory (RAM), read-only memory (ROM), electronically programmable memory (EPROM or EEPROM), or flash memory. The term "non-transitory computer-readable storage medium" encompasses all computer-readable storage media, with the sole exception being a transitory, propagating signal. The coding for implementing the present invention may be written in any suitable programming language or modeling system software, such as AIMMS. Solvers that can be used to solve the equations used in the present invention include CPLEX, XPress, KNITRO, CONOPT, GUROBI, and XA.

The presently disclosed subject matter may also be embodied as a computer system that is programmed to perform the various processes described herein. The computer system may include various components for performing these processes, including processors, memory, input devices, and/or displays. The computer system may be any suitable computing device, including general purpose computers, embedded computer systems, network devices, or mobile devices, such as handheld computers, laptop computers, notebook computers, tablet computers, mobile phones, and the like. The computer system may be a standalone computer or may operate in a networked or cloud environment. The application may be executed in a standalone or "disconnected" mode with the capability to merge and/or sync the standalone results with the results obtained by other users of the application.

It is contemplated that the operational programming application in accordance with the presently disclosed subject matter is capable of communicating with other systems commonly used by the business (e.g., finance, process control, equipment maintenance) such that data can be commonly shared and updated.

Although the various systems, modules, functions, or components of the present invention may be described separately, in implementation, they do not necessarily exist as separate elements. The various functions and capabilities disclosed herein may be performed by separate units or be combined into a single unit. Further, the division of work between the functional units can vary. Furthermore, the functional distinctions that are described herein may be integrated in various ways.

ADDITIONAL EMBODIMENTS

Embodiment 1

A method of programming and operating a facility, comprising: (a) using a computer system that stores an operational programming application, wherein the operational programming application comprises an operational program for determining the operation of at least one facility; (b) acquiring data from operational events of the at least one facility and entering the data into the operational program, wherein feasibility of the operational program is maintained; (c) setting a scope of the data to be analyzed, wherein the scope of the analysis is defined based on at least one operational event of interest; (d) assembling the data within the scope of the analysis in a structured and automated manner; (e) processing the assembled data using at least one of a mathematical model defined from the assembled data and a strategy-based procedure and obtaining results for the defined scope of the analysis; (f) disassembling the obtained results in a structured and automated manner according to the obtained results; (g) adjusting the operational program by incorporating the obtained result into the program; and (h) programming and operating the at least one facility according to the adjusted operational program.

Embodiment 2

The method of Embodiment 1, wherein the scope of the analysis is set based on the at least one operational event that affects at least a portion of a facility, a single facility, multiple facilities or one or more portions of multiple facilities.

Embodiment 3

The method according to any one of the preceding Embodiments, wherein the scope of the analysis is set according to a duration of the at least one operational event of interest.

Embodiment 4

The method of Embodiment 3, wherein the scope of the analysis is set according to a duration of an effect that the at least one operational event has on the at least one facility.

Embodiment 5

The method according to any one of the preceding Embodiments, wherein processing the assembled data comprising using a mathematical model defined from the assembled data.

Embodiment 6

The method according to any one of Embodiments 1-4, wherein processing the assembled data comprising using a strategy-based procedure.

Embodiment 7

The method according to any one of Embodiments 1-4, wherein processing the assembly data comprising using both a mathematical model defined from the assembled data and a strategy-based procedure.

Embodiment 8

The method according to anyone of the preceding Embodiments, wherein the operational events of the at least one facility entered into the operational program are one of two types of events: defined operational events and undefined operational events.

Embodiment 9

The method of Embodiment 8, wherein a ratio of a number of the defined operational events to a number of the undefined operational events entered into the operational program changes with passage of time.

Embodiment 10

The method of Embodiment 8, wherein a ratio of a number of the defined operational events to a number of the undefined operational events entered into the operational program increases with passage of time.

Embodiment 11

A computer system for determining the operation of a facility, the computer system being programmed to perform steps that comprise: (a) storing an operational programming application, wherein the operational programming application comprises an operational program for determining the operation of at least one facility; (b) acquiring data from operational events of the at least one facility and entering the data into the operational program, wherein feasibility of the operational program is maintained; (c) setting a scope of the data to be analyzed, wherein the scope of the analysis is defined based on at least one operational event of interest; (d) assembling the data within the scope of the analysis in a structured and automated manner; (e) processing the assembled data using at least one of a mathematical model defined from the assembled data and a strategy-based procedure and obtaining results for the defined scope of the analysis; (f) disassembling the obtained results in a structured and automated manner according to the obtained results; and (g) adjusting the operational program by incorporating the obtained result into the program.

Embodiment 12

The computer system of Embodiment 11, wherein the scope of the analysis is set based on the at least one operational event that affects at least a portion of a facility, a single facility, multiple facilities or one or more portions of multiple facilities.

Embodiment 13

The computer system of Embodiments 11 or 12, wherein the scope of the analysis is set according to a duration of the at least one operational event of interest.

Embodiment 14

The computer system of Embodiment 13, wherein the scope of the analysis is set according to a duration of an effect that the at least one operational event has on the at least one facility.

Embodiment 15

The computer system according to any one of Embodiments 11-14, wherein processing the assembled data comprising using a mathematical model defined from the assembled data.

Embodiment 16

The computer system according to any one of Embodiments 11-14, wherein processing the assembled data comprising using a strategy-based procedure.

Embodiment 17

The computer system according to any one of Embodiments 11-14, wherein processing the assembly data comprising using both a mathematical model defined from the assembled data and a strategy-based procedure.

Embodiment 18

The computer system according to any one of Embodiments 11-17, wherein the operational events of the at least one facility entered into the operational program are one of two types of events: defined operational events and undefined operational events.

Embodiment 19

The computer system of Embodiment 18, wherein a ratio of a number of the defined operational events to a number of the undefined operational events entered into the operational program changes with passage of time.

Embodiment 20

The computer system of Embodiment 18, wherein a ratio of a number of the defined operational events to a number of the undefined operational events entered into the operational program increases with passage of time.

Embodiment 21

A non-transitory machine-readable storage medium comprising instructions which, when executed by a processor, cause the processor to: (a) store an operational programming application, wherein the operational programming application comprises an operational program for determining the operation of at least one facility; (b) acquire data from operational events of the at least one facility and entering the data into the operational program, wherein feasibility of the operational program is maintained; (c) set scope of the data to be analyzed, wherein the scope of the analysis is defined based on at least one operational event of interest; (d) assemble the data within the scope of the analysis in a structured and automated manner; (e) process the assembled data using at least one of a mathematical model defined from the assembled data and a strategy-based procedure and obtain results for the defined scope of the analysis; (f) disassemble the obtained results in a structured and automated manner according to the obtained results; and (g) adjust the operational program by incorporating the obtained result into the program.

Embodiment 22

The non-transitory machine-readable storage medium of Embodiment 21, wherein the scope of the analysis is set based on the at least one operational event that affects at least a portion of a facility, a single facility, multiple facilities or one or more portions of multiple facilities.

Embodiment 23

The non-transitory machine-readable storage medium of Embodiment 21 or 22, wherein the scope of the analysis is set according to a duration of the at least one operational event of interest.

Embodiment 24

The non-transitory machine-readable storage medium of Embodiment 23, wherein the scope of the analysis is set according to a duration of an effect that the at least one operational event has on the at least one facility.

Embodiment 25

The non-transitory machine-readable storage medium according to any one of Embodiments 21-24, wherein processing the assembled data comprising using a mathematical model defined from the assembled data.

Embodiment 26

The non-transitory machine-readable storage medium according to any one of Embodiments 21-24, wherein processing the assembled data comprising using a strategy-based procedure.

Embodiment 27

The non-transitory machine-readable storage medium according to any one of Embodiments 21-24, wherein processing the assembly data comprising using both a mathematical model defined from the assembled data and a strategy-based procedure.

Embodiment 28

The non-transitory machine-readable storage medium according to any one of Embodiments 21-24, wherein the operational events of the at least one facility entered into the operational program are one of two types of events: defined operational events and undefined operational events.

The foregoing description and examples have been set forth merely to illustrate the invention and are not intended to be limiting. Each of the disclosed aspects and embodiments of the present invention may be considered individually or in combination with other aspects, embodiments, and variations of the invention. Modifications of the disclosed embodiments incorporating the spirit and substance of the invention may occur to persons skilled in the art and such modifications are within the scope of the present invention.

The invention claimed is:

1. A method of programming and operating a facility, comprising:
    (a) using a computer system that stores an operational programming application, wherein the operational programming application comprises an operational program for determining the operation of at least one facility;
    (b) acquiring data from operational events of the at least one facility and entering the data into the operational program, wherein feasibility of the operational program is maintained, wherein the operational events of the at least one facility entered into the operational program are one of two types of events: defined operational events and undefined operational events, wherein a ratio of a number of the defined operational events to a number of the undefined operational events entered into the operational program changes with passage of time, wherein a ratio of a number of the defined operational events to a number of the undefined operational events entered into the operational program increases with passage of time;
    (c) setting a scope of the data to be analyzed, wherein the scope of the analysis is defined based on at least one operational event of interest;
    (d) assembling the data within the scope of the analysis in a structured and automated manner;
    (e) processing the assembled data using a strategy-based procedure and obtaining results for the defined scope of the analysis, wherein the strategy-based procedure is based upon at least one of specific conditions, business drivers and uncertain parameters;
    (f) disassembling the obtained results in a structured and automated manner according to the obtained results;
    (g) adjusting the operational program by incorporating the obtained result into the program; and
    (h) programming and operating the at least one facility according to the adjusted operational program.

2. The method of claim 1, wherein the scope of the analysis is set based on the at least one operational event that affects at least a portion of a facility, a single facility, multiple facilities or one or more portions of multiple facilities.

3. The method of claim 2, wherein the scope of the analysis is set according to a duration of the at least one operational event of interest.

4. The method of claim 1, wherein the scope of the analysis is set according to a duration of an effect that the at least one operational event has on the at least one facility.

5. The method of claim 1, wherein the strategy-based procedure is adjusted to minimize an impact based upon uncertain parameters.

6. The method of claim 1, wherein the strategy-based procedure is adjusted in response to at least one of known specific conditions and business drivers.

7. The method of claim 1, wherein processing the assembly data comprising using both the strategy-based procedure and a mathematical model defined from the assembled data.

8. A computer system for determining the operation of a facility, the computer system having executable instructions stored in a memory and being programmed to perform steps that comprise:
(a) storing an operational programming application, wherein the operational programming application comprises an operational program for determining the operation of at least one facility;
(b) acquiring data from operational events of the at least one facility and entering the data into the operational program, wherein feasibility of the operational program is maintained, wherein the operational events of the at least one facility entered into the operational program are one of two types of events: defined operational events and undefined operational events, wherein a ratio of a number of the defined operational events to a number of the undefined operational events entered into the operational program changes with passage of time, wherein a ratio of a number of the defined operational events to a number of the undefined operational events entered into the operational program increases with passage of time;
(c) setting a scope of the data to be analyzed, wherein the scope of the analysis is defined based on at least one operational event of interest;
(d) assembling the data within the scope of the analysis in a structured and automated manner;
(e) processing the assembled data using a strategy-based procedure and obtaining results for the defined scope of the analysis, wherein the strategy-based procedure is based upon at least one of specific conditions, business drivers and uncertain parameters;
(f) disassembling the obtained results in a structured and automated manner according to the obtained results; and
(g) adjusting the operational program by incorporating the obtained result into the program.

9. The computer system of claim 8, wherein the scope of the analysis is set based on the at least one operational event that affects at least a portion of a facility, a single facility, multiple facilities or one or more portions of multiple facilities.

10. The computer system of claim 9, wherein the scope of the analysis is set according to a duration of the at least one operational event of interest.

11. The computer system of claim 8, wherein the scope of the analysis is set according to a duration of an effect that the at least one operational event has on the at least one facility.

12. The computer system of claim 8, wherein the strategy-based procedure is adjusted to minimize an impact based upon uncertain parameters.

13. The computer system of claim 8, wherein the strategy-based procedure is adjusted in response to at least one of known specific conditions and business drivers.

14. The computer system of claim 8, wherein processing the assembly data comprising using both the strategy-based procedure and a mathematical model defined from the assembled data.

15. A non-transitory machine-readable storage medium comprising instructions which, when executed by a processor, cause the processor to:
(a) store an operational programming application, wherein the operational programming application comprises an operational program for determining the operation of at least one facility;
(b) acquire data from operational events of the at least one facility and entering the data into the operational program, wherein feasibility of the operational program is maintained, wherein the operational events of the at least one facility entered into the operational program are one of two types of events: defined operational events and undefined operational events, wherein a ratio of a number of the defined operational events to a number of the undefined operational events entered into the operational program changes with passage of time, wherein a ratio of a number of the defined operational events to a number of the undefined operational events entered into the operational program increases with passage of time;
(c) set scope of the data to be analyzed, wherein the scope of the analysis is defined based on at least one operational event of interest;
(d) assemble the data within the scope of the analysis in a structured and automated manner;
(e) processing the assembled data using a strategy-based procedure and obtaining results for the defined scope of the analysis, wherein the strategy-based procedure is based upon at least one of specific conditions, business drivers and uncertain parameters;
(f) disassemble the obtained results in a structured and automated manner according to the obtained results; and
(g) adjust the operational program by incorporating the obtained result into the program.

16. The non-transitory machine-readable storage medium of claim 15, wherein the scope of the analysis is set based on the at least one operational event that affects at least a portion of a facility, a single facility, multiple facilities or one or more portions of multiple facilities.

17. The non-transitory machine-readable storage medium of claim 16, wherein the scope of the analysis is set according to a duration of the at least one operational event of interest.

18. The non-transitory machine-readable storage medium of claim 15, wherein the scope of the analysis is set according to a duration of an effect that the at least one operational event has on the at least one facility.

19. The non-transitory machine-readable storage medium of claim 15, wherein the strategy-based procedure is adjusted to minimize an impact based upon uncertain parameters.

20. The non-transitory machine-readable storage medium of claim 15, wherein the strategy-based procedure is adjusted in response to at least one of known specific conditions and business drivers.

21. The non-transitory machine-readable storage medium of claim 15, wherein processing the assembly data comprising using both the strategy-based procedure and a mathematical model defined from the assembled data.

* * * * *